United States Patent
Conti et al.

(10) Patent No.: US 10,621,842 B2
(45) Date of Patent: *Apr. 14, 2020

(54) AUTO-LEARNING GENERATION AND USE OF OBJECTS CHECKLIST BASED ON PROXIMITY CONTROL

(71) Applicant: International Business Machines Corporation, Armonk, NY (US)

(72) Inventors: Chiara Conti, Rome (IT); Emilio De Angelis, Rome (IT); Claudio Marinelli, Latina (IT); Stefania Oliverio, Rome (IT); Roberto Pecoraro, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/661,374

(22) Filed: Oct. 23, 2019

(65) Prior Publication Data

US 2020/0058206 A1 Feb. 20, 2020

Related U.S. Application Data

(63) Continuation of application No. 15/433,079, filed on Feb. 15, 2017.

(51) Int. Cl.
*G06Q 10/08* (2012.01)
*G08B 13/24* (2006.01)
(Continued)

(52) U.S. Cl.
CPC ......... *G08B 13/2417* (2013.01); *G08B 25/08* (2013.01); *H04L 51/24* (2013.01);
(Continued)

(58) Field of Classification Search
CPC .................................................. G08B 13/2417
See application file for complete search history.

(56) References Cited

U.S. PATENT DOCUMENTS 6,819,222 B2    11/2004   Lin et al.
7,002,473 B2 *   2/2006   Glick ................. G08B 13/1427
                                                                  340/572.1
(Continued)

FOREIGN PATENT DOCUMENTS

DE        602005005773 T2     4/2009

OTHER PUBLICATIONS

Gaetano Borriello et al., "Reminding about Tagged Objects using Passive RFIDs", Department of Computer Science and Engineering, University of Washington, Oct. 2004, 18 pages.
(Continued)

*Primary Examiner* — Joseph H Feild
*Assistant Examiner* — Pameshanand Mahase
(74) *Attorney, Agent, or Firm* — Nicholas D. Bowman; Madeline F. Schiesser; Keohane & D'Alessandro PLLC

(57) ABSTRACT

Approaches for generating an alert in an absence of a radio-frequency identification (RFID) tag in proximity to a mobile device are provided herein. RFID tags are detected in proximity to the first mobile device, which has a RFID receiver. The alert is generated in response to alert conditions, including a determination that a RFID tag identifier stored in a first profile list is not among detected RFID tags and that an RFID tag stored in the first profile list is not in proximity to a second device. The alert is transmitted to the second mobile device, wherein the alert adds, responsive to the stored RFID tag not being among the detected RFID tags at the first device, the stored RFID tag to a second profile list associated with the second mobile device for storing RFID tag identifiers, wherein the second profile list is separate from the first profile list.

20 Claims, 6 Drawing Sheets

(51) Int. Cl.
*H04W 4/02* (2018.01)
*H04W 4/12* (2009.01)
*H04L 12/58* (2006.01)
*H04W 4/90* (2018.01)
*H04W 4/80* (2018.01)
*G08B 25/08* (2006.01)
*H04L 29/08* (2006.01)
*G06K 7/10* (2006.01)

(52) U.S. Cl.
CPC ............ *H04L 51/32* (2013.01); *H04L 67/303* (2013.01); *H04W 4/023* (2013.01); *H04W 4/12* (2013.01); *H04W 4/80* (2018.02); *H04W 4/90* (2018.02); *G06K 7/10128* (2013.01)

(56) References Cited

U.S. PATENT DOCUMENTS

| | | | |
|---|---|---|---|
| 7,323,988 B2 * | 1/2008 | Krstulich | G08B 13/1427 340/539.13 |
| 7,406,439 B2 | 7/2008 | Bodin et al. | |
| 7,518,514 B2 * | 4/2009 | Bauchot | G06Q 10/087 340/539.11 |
| 7,821,386 B1 | 10/2010 | Barrett et al. | |
| 7,880,613 B1 * | 2/2011 | Maeng | G06K 7/0008 340/10.42 |
| 8,717,165 B2 | 5/2014 | Gernandt et al. | |
| 8,718,669 B2 | 5/2014 | Lewis et al. | |
| 2011/0148625 A1 * | 6/2011 | Velusamy | G08B 13/1427 340/539.13 |
| 2014/0006943 A1 | 1/2014 | Robbins et al. | |
| 2014/0084060 A1 | 3/2014 | Jain et al. | |
| 2016/0021152 A1 | 1/2016 | Maguire et al. | |

OTHER PUBLICATIONS

Mahase, Pameshanand, U.S. Appl. No. 15/433,079, Office Action dated Sep. 28, 2018, 15 pgs.
Mahase, Pameshanand, U.S. Appl. No. 15/433,079, Final Office Action dated Feb. 8, 2019, 13 pgs.
Mahase, Pameshanand, U.S. Appl. No. 15/433,079, Office Action dated Jun. 3, 2019, 13 pgs.
Mahase, Pameshanand, U.S. Appl. No. 15/433,079, Notice of Allowance dated Sep. 20, 2019, 8 pgs.

* cited by examiner

US 10,621,842 B2

AUTO-LEARNING GENERATION AND USE OF OBJECTS CHECKLIST BASED ON PROXIMITY CONTROL

CROSS-REFERENCE TO RELATED APPLICATIONS

The present patent document is a continuation of U.S. patent application Ser. No. 15/433,079, filed Feb. 15, 2017, entitled "AUTO-LEARNING GENERATION AND USE OF OBJECTS CHECKLIST BASED ON PROXIMITY CONTROL", the disclosure of which is incorporated herein by reference.

FIELD OF THE INVENTION

Embodiments of the present invention relate generally to generating an alert on a mobile device, and more specifically, to generating an alert on a mobile device in an absence of a radio-frequency identification (RFID) tag. Embodiments of the present invention relate further to a system for generating an alert on a mobile device in an absence of a RFID tag, and a computer program product for the same.

BACKGROUND

When carrying out activities, people may need tools, items, or other equipment, be it for a professional activity, for a repair job, or for leisure. People may also need tools, items, or other equipment for travel activities or to just take to a meeting, such as a personal computer or a beamer. In some cases, people have developed checklists in order to not forget items required for accomplishing a task or performing an activity. Few things are more frustrating for a person than arriving at an event location to start an activity only to realize that he or she has forgotten an important item to bring to the location.

Accordingly, people have developed organizational and partially technical instruments in order to not forget important items for an activity, including radio-frequency identification (RFID) tags attached to physical items. However, maintaining often complex and long lists of items equipped with a RFID tag required for a special activity can be burdensome and time consuming.

SUMMARY

Approaches for generating an alert in an absence of a radio-frequency identification (RFID) tag in proximity to a mobile device are provided herein. RFID tags are detected in proximity to the first mobile device, which has a RFID receiver. The alert is generated in response to alert conditions, including a determination that a RFID tag identifier stored in a first profile list is not among detected RFID tags and that an RFID tag stored in the first profile list is not in proximity to a second device. The alert is transmitted to the second mobile device, wherein the alert adds, responsive to the stored RFID tag not being among the detected RFID tags at the first device, the stored RFID tag to a second profile list associated with the second mobile device for storing RFID tag identifiers, wherein the second profile list is separate from the first profile list.

One aspect of the present invention includes a computer-implemented method for generating an alert in an absence of a radio-frequency identification (RFID) tag in a proximity to a first mobile device, the first mobile device comprising a RFID receiver, the method comprising: detecting RFID tags in proximity to the first mobile device; generating the alert in response to alert conditions, wherein the alert conditions comprise a determination that a RFID tag identifier stored in a first profile list is not among RFID tag identifiers corresponding to the detected RFID tags and that an RFID tag corresponding to the RFID tag identifier stored in the first profile list is not in proximity to a second device; and transmitting the alert to the second mobile device, the second mobile device not being in the proximity to the first mobile device, wherein the alert adds, responsive to the RFID tag identifier stored in the first profile list not being among the RFID tag identifiers corresponding to the detected RFID tags at the first device, the RFID tag identifier stored in the first profile list that was not among the RFID tag identifiers corresponding to the detected RFID tags to a second profile list associated with the second mobile device for storing RFID tag identifiers, wherein the second profile list is separate from the first profile list.

Another aspect of the present invention includes a system for generating an alert in an absence of a radio-frequency identification (RFID) tag in a proximity to a first mobile device, the first mobile device comprising a RFID receiver, the system comprising: a memory medium comprising program instructions; a bus coupled to the memory medium; and a processor, for executing the program instructions, that when executing the program instructions causes the system to: detect RFID tags in proximity to the first mobile device; generate the alert in response to alert conditions, wherein the alert conditions comprise a determination that a RFID tag identifier stored in a first profile list is not among RFID tag identifiers corresponding to the detected RFID tags and that an RFID tag corresponding to the RFID tag identifier stored in the first profile list is not in proximity to a second device; and transmit the alert to the second mobile device, the second mobile device not being in the proximity to the first mobile device, wherein the alert adds, responsive to the RFID tag identifier stored in the first profile list not being among the RFID tag identifiers corresponding to the detected RFID tags at the first device, the RFID tag identifier stored in the first profile list that was not among the RFID tag identifiers corresponding to the detected RFID tags to a second profile list associated with the second mobile device for storing RFID tag identifiers, wherein the second profile list is separate from the first profile list.

Yet another aspect of the present invention includes a computer program product for generating an alert in an absence of a radio-frequency identification (RFID) tag in a proximity to a first mobile device, the first mobile device comprising a RFID receiver, the computer program product comprising a computer readable hardware storage device having program instructions embodied therewith, the program instructions being executable by one or more computing systems to cause the one or more computing systems to: detect RFID tags in proximity to the first mobile device; generate the alert in response to alert conditions, wherein the alert conditions comprise a determination that a RFID tag identifier stored in a first profile list is not among RFID tag identifiers corresponding to the detected RFID tags and that an RFID tag corresponding to the RFID tag identifier stored in the first profile list is not in proximity to a second device; and transmit the alert to the second mobile device, the second mobile device not being in the proximity to the first mobile device, wherein the alert adds, responsive to the RFID tag identifier stored in the first profile list not being among the RFID tag identifiers corresponding to the detected RFID tags at the first device, the RFID tag identifier stored in the first profile list that was not among the RFID tag identifiers corresponding to the detected RFID tags to a second profile list associated with the second mobile device for storing RFID tag identifiers, wherein the second profile list is separate from the first profile list. The computer program product can be accessible from a computer-usable or computer-readable hardware storage device providing program code for use, by or in connection with a computer or any instruction execution system. For the purpose of this description, a computer-usable or computer-readable hardware storage device can be any apparatus that can contain means for storing, communicating, or transporting the program for use, by or in a connection with the instruction execution system, apparatus, or device.

BRIEF DESCRIPTION OF THE DRAWINGS

It should be understood that embodiments of the present invention are described with reference to different subject matters. In particular, some embodiments are described with reference to methods, whereas other embodiments have been described with reference to apparatuses. However, a person skilled in the art will gather from the above and the following description that, unless otherwise stated, in addition to any combination of features belonging to one type of subject matter, any combination between features relating to different subject matters, in particular, between features of the methods and features of the apparatuses, is considered as to be disclosed within this document.

Aspects defined above and further aspects of embodiments of the present invention are apparent from the example embodiments described hereinafter and are explained with reference to the example embodiments, but to which embodiments of the present invention are not limited.

Figure 1:
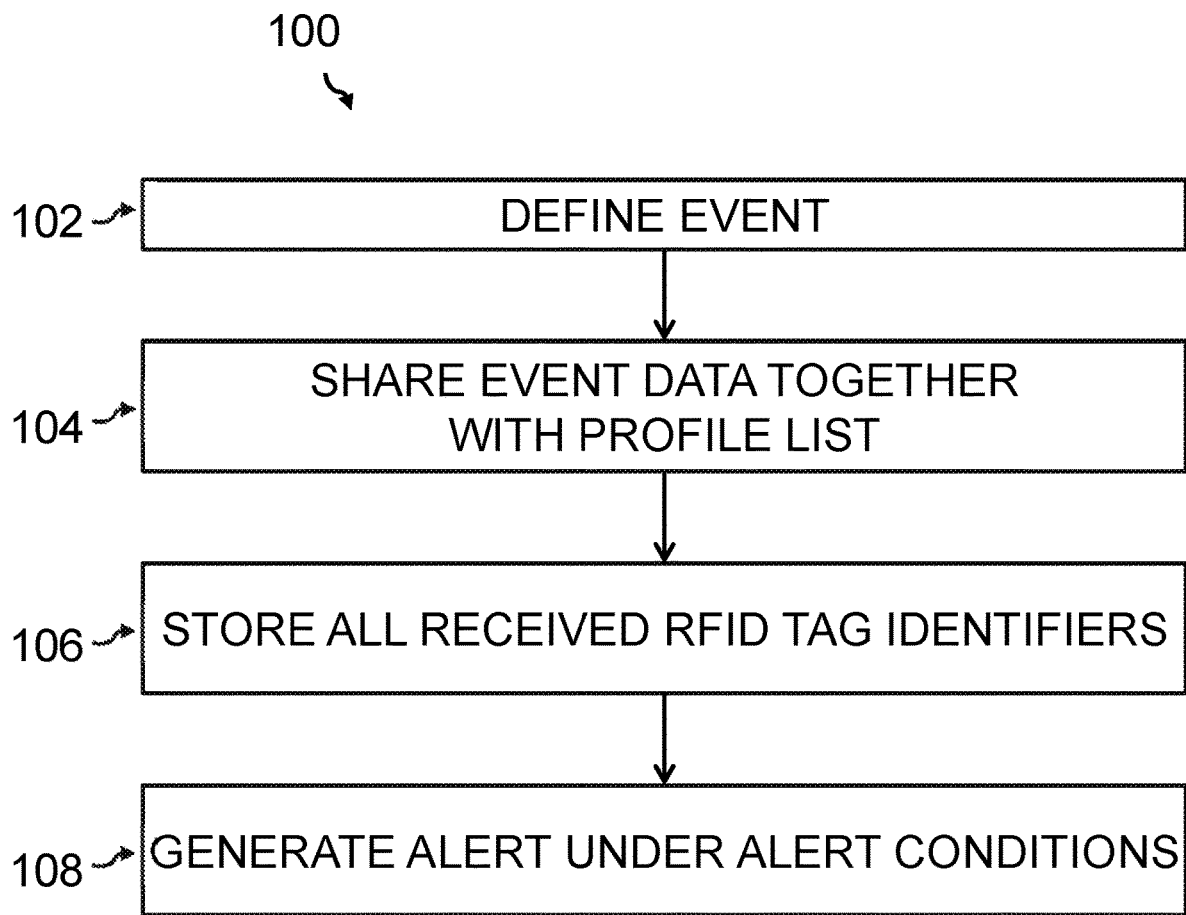

Embodiments of the present invention will be described, by way of example only, and with reference to the following drawings:

FIG. 1 shows a block diagram of a method for generating an alert on a mobile device in an absence of a radio-frequency identification (RFID) tag according to illustrative embodiments of the present invention.

Figure 2:
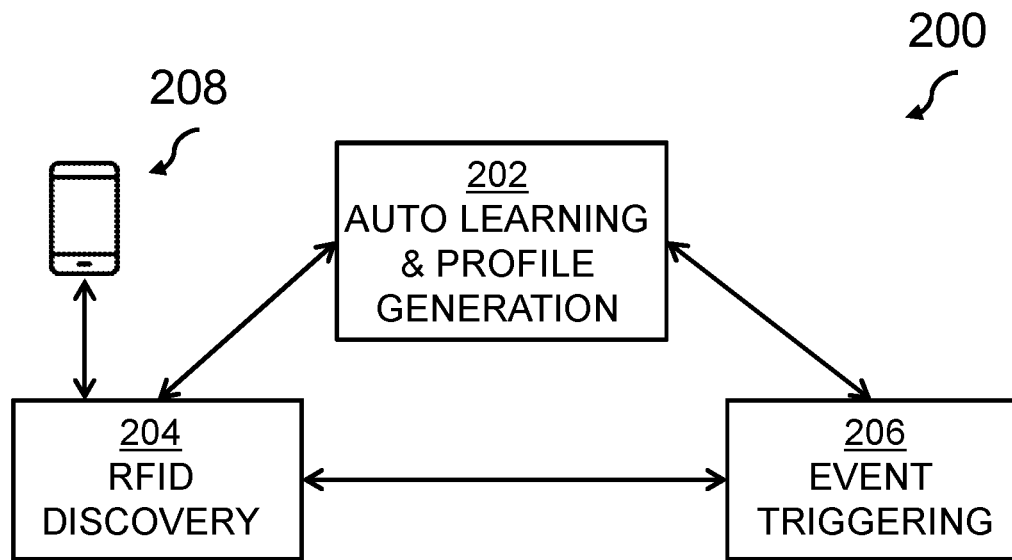

FIG. 2 shows an overview block diagram of the method of FIG. 1 with three main components according to illustrative embodiments of the present invention.

Figure 3:
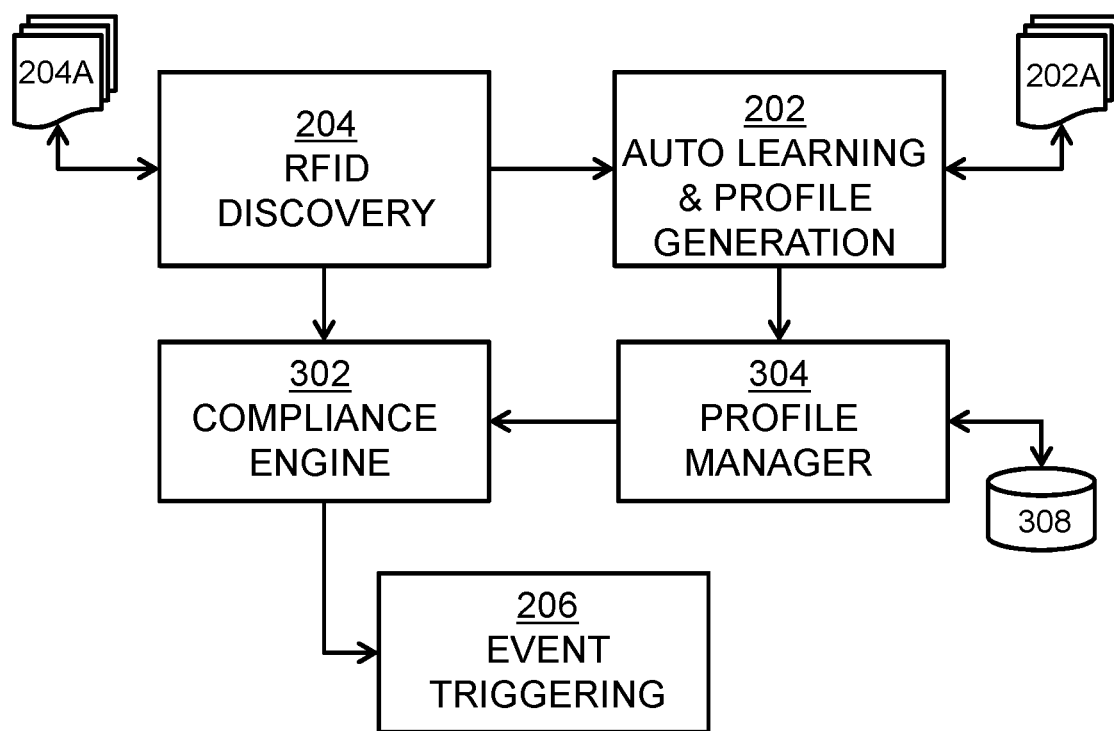

FIG. 3 shows a further block diagram of the method of FIG. 1 including the profile list according to illustrative embodiments of the present invention.

Figure 4:
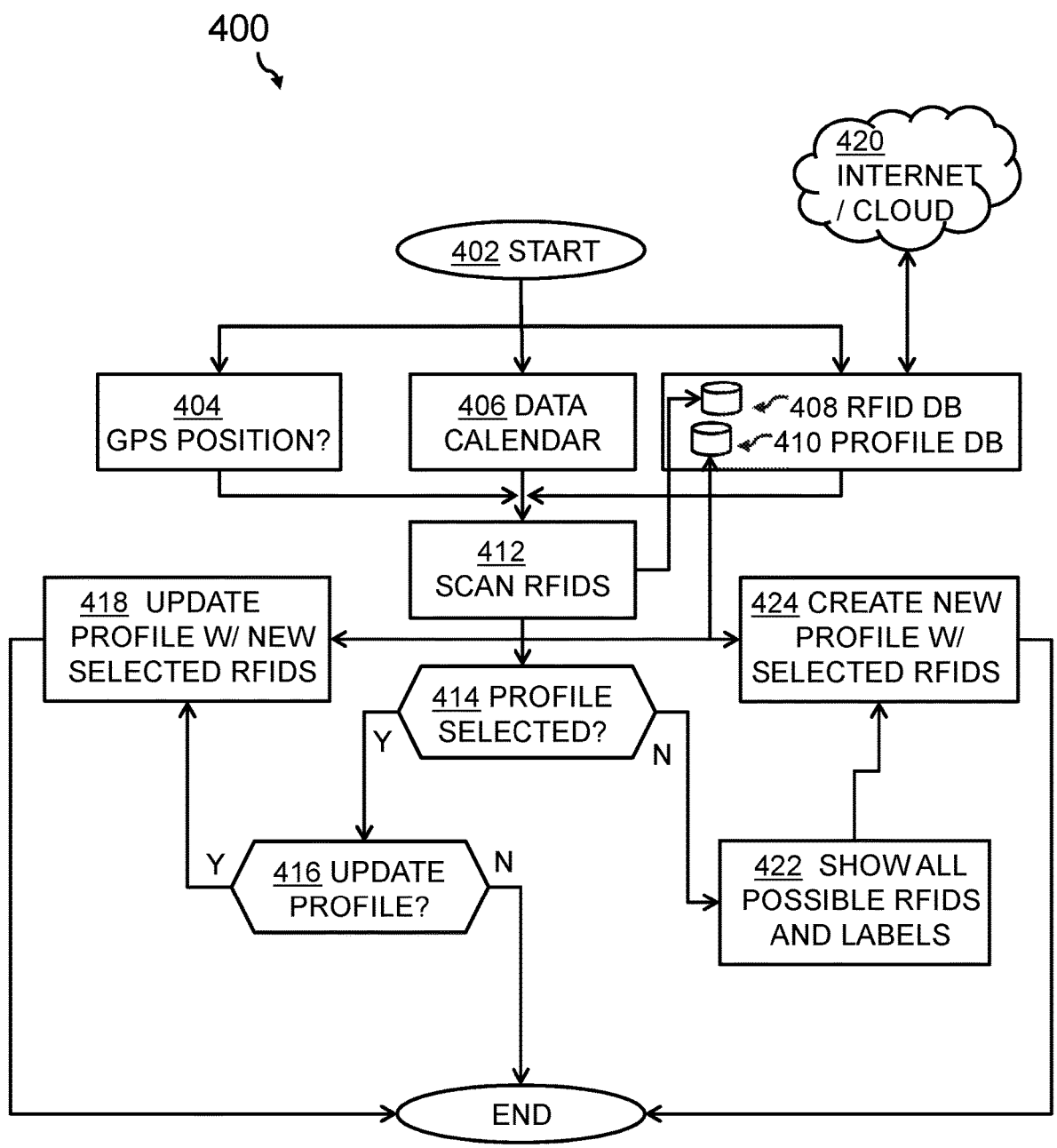

FIG. 4 shows another block diagram of the method of FIG. 1 in the initiation phase according to illustrative embodiments of the present invention.

Figure 5:
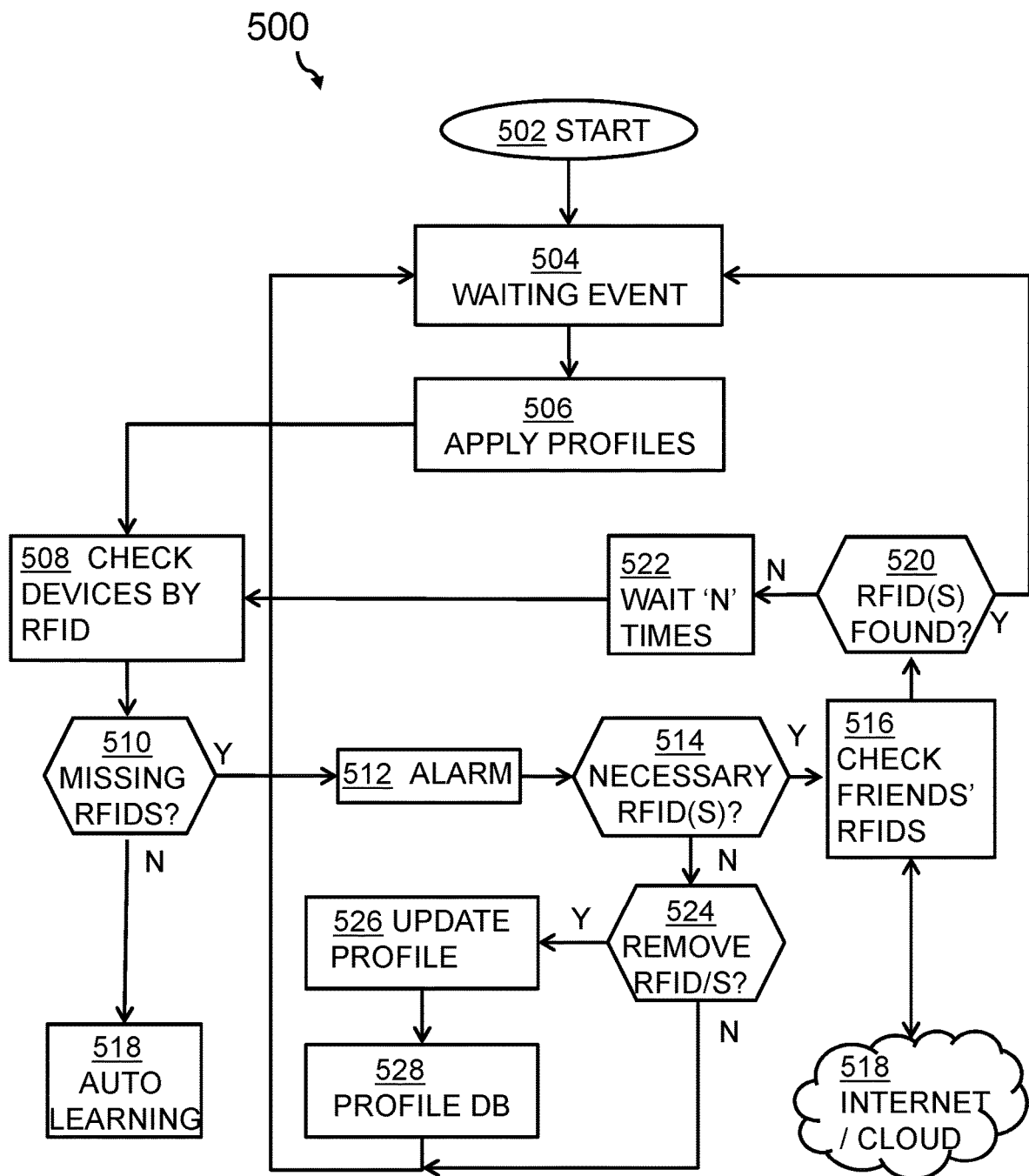

FIG. 5 shows another block diagram of the method of FIG. 1 in the application phase according to illustrative embodiments of the present invention.

Figure 6:
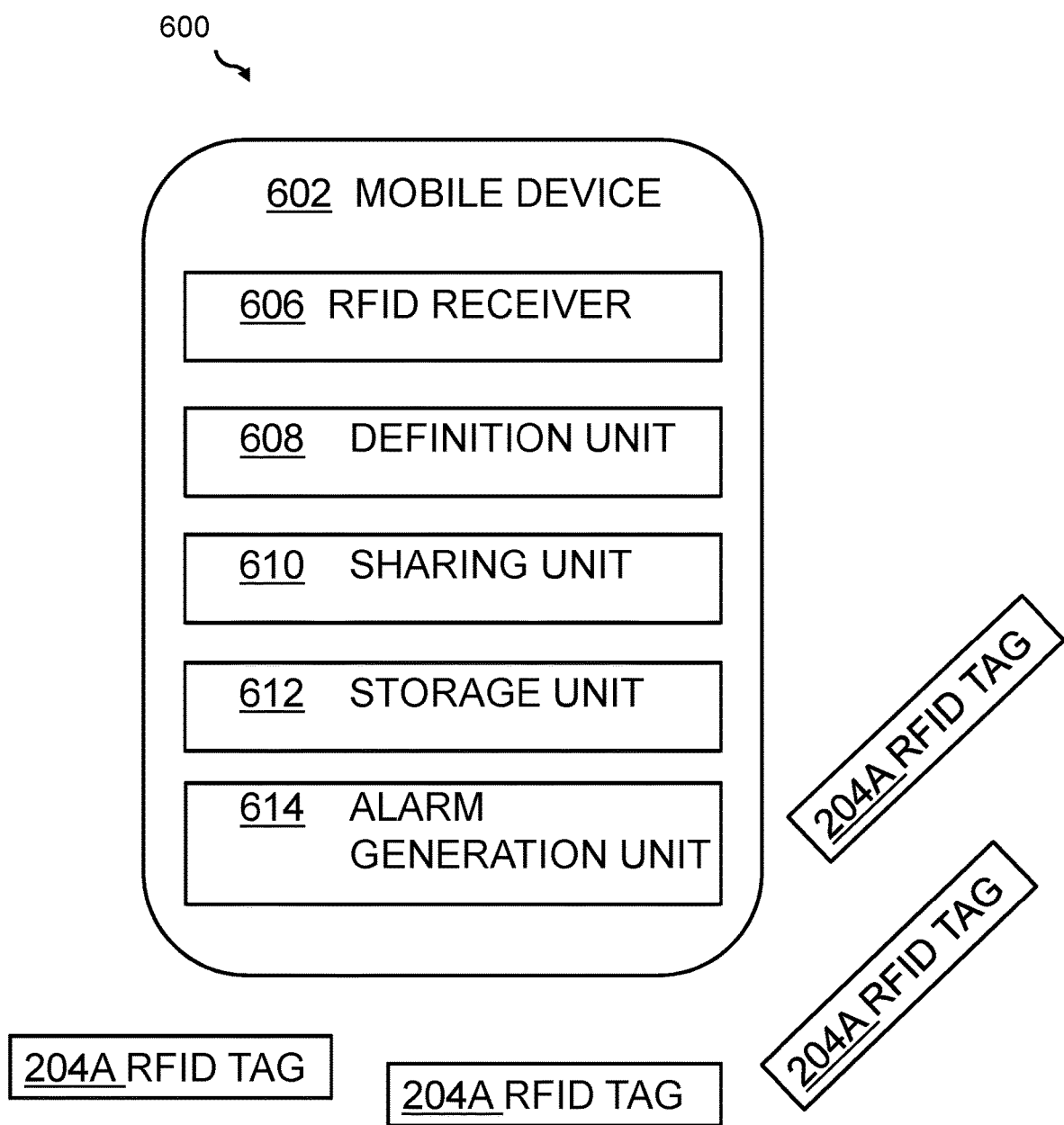

FIG. 6 shows a system for generating an alert on a mobile device in an absence of a RFID tag according to illustrative embodiments of the present invention.

Figure 7:
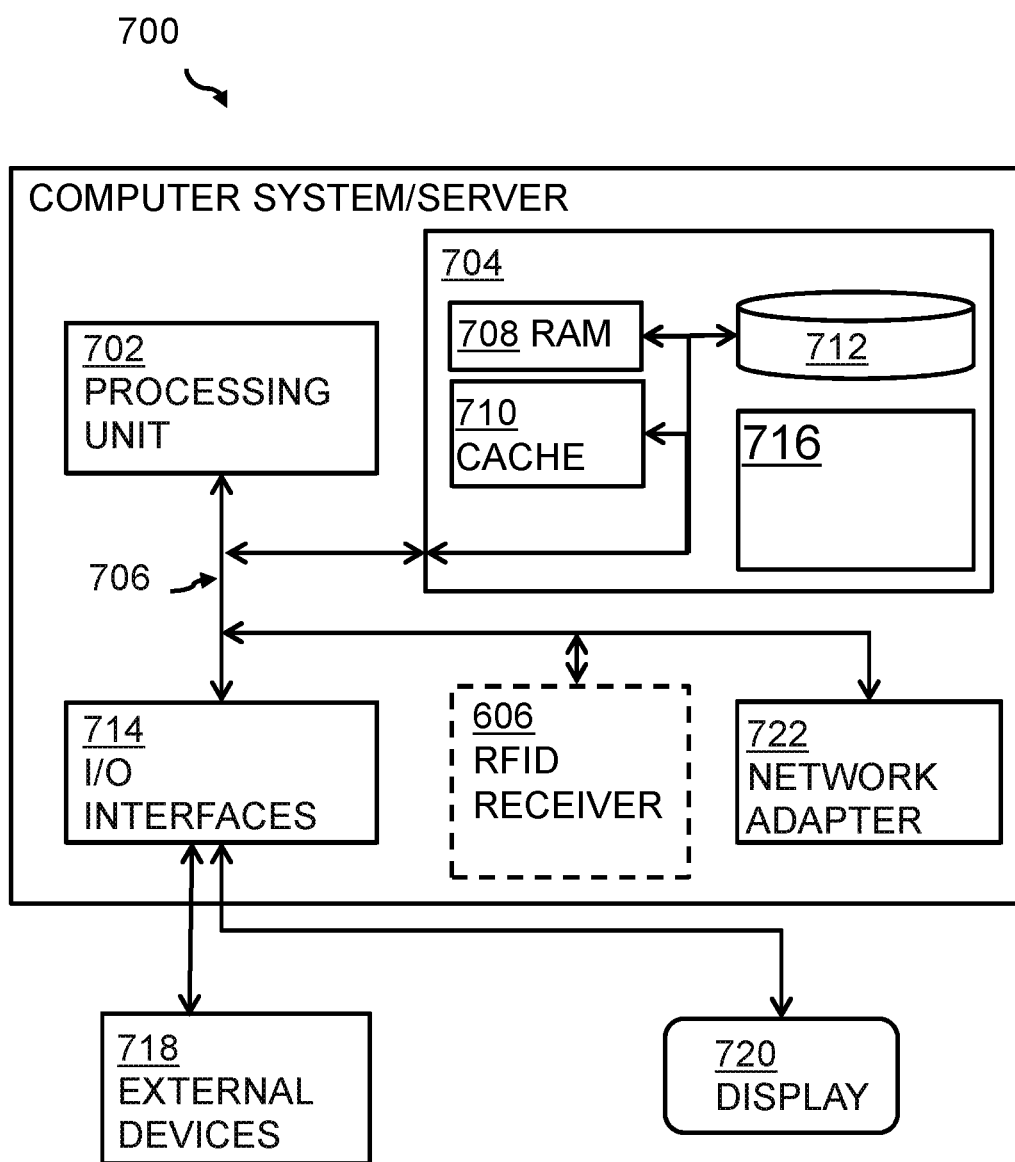

FIG. 7 shows a computing system comprising the system of FIG. 6 for generating an alert according to illustrative embodiments of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

In the context of this description, the following conventions, terms, and/or expressions may be used:

The term 'mobile device' denotes any mobile device easily carried by a user. It can be a smart phone, a personal digital assistant (PDA), a tablet computer, a phablet, or a dedicated device for performing the method of embodiments of the present invention. In this case, the dedicated device can have comparable capabilities of a smart phone without the function to make phone calls. However, the dedicated device can allow mobile data communication and have a screen and input/output capabilities. In the context of this description, it may be generally assumed that there is a 1:1 relationship between a user and a mobile device. However, a user may use different mobile devices for different types of events. For example, he or she may use a business phone for business events and a private mobile device for events outside his or her job. Methods of embodiments of the present invention can function in both or either scenarios. Methods of embodiments of the present invention can also be implemented with a two SIM (subscriber identification module) card mobile device.

The term 'RFID tag' denotes a radio-frequency identification (RFID) tag which can use electromagnetic fields to automatically identify and track identification tags attached to objects. Each tag can contain electronically stored information (e.g., a RFID identifier). Passive tags collect energy from a nearby RFID reader's interrogating radio waves. Active tags have a local power source such as a battery and may operate over larger distances. Unlike a barcode, the tag need not be within the line of sight of the RFID reader, so it can be embedded in a tracked object. A RFID tag can also be glued to an item of interest (i.e., an item that may need to be tracked). RFID tagging is one method for Automatic Identification and Data Capture (AIDC).

The term 'proximity' denotes an environment with a maximum of a predefined distance or a predefined closed space and, as used herein, the distance between a mobile device and a RFID tag. In one embodiment, the predefined distance may be in the range of several meters.

The term 'RFID receiver' (or RFID reader) denotes a system that is part of or attached to a mobile device. The system can be adapted to receive signals from a RFID tag and to identify a RFID identifier stored in the RFID tag. Tags can be either active or passive tags.

The term 'event' denotes that something takes place or will take place (in particular, a significant occurrence). The event to happen may be defined by a time/date entry in a calendar. A duration and a specific location may also be part of a definition of an event, as well as an event name and/or other profile data.

The term 'profile list' denotes a list of electronically stored RFID tag identifiers. Each RFID tag may have its own unique identification code. The profile list can be used to ensure that none of the items to which the RFID tag are attached to are forgotten for an event.

The term 'WiFi' denotes a technology that allows electronic devices to connect to a wireless local area network (WLAN), mainly using the 2.4 gigahertz (12 cm) UHF (ultra-high frequency) and 5 gigahertz (6 cm) SHF (super high frequency) ISM (industrial, scientific, and medical) radio bands. A WLAN is usually password protected, but may be open, which allows any device within range of the WLAN to access resources of the WLAN.

The term 'home location' denotes a location serving typically as a starting point for an activity of a user of a mobile device. This may be his or her home or his or her office or any other user definable location. A different home location may be defined for different events.

The term 'intermediate position' denotes any path element on a way from the home or starting location to an event location. A typical intermediate location depends on the home location. The intermediate location can be a location outside the influence sphere of the home location but close enough to the home location so that it is easy for a user to fetch a RFID tagged item that he or she may have forgotten to collect before the event and before leaving the home location. Thus, a good place for an intermediate location is, for example, a pathway in front of the home location or a corridor in front of an office location. Also, a user's car can be defined as an intermediate location. Generally, a user may define any event-specific intermediate position.

It should also be understood that an implementation with a RFID tag is but one option of a method of embodiments of the present invention. Embodiments of the present invention can also be implemented with Bluetooth tags instead of RFID tags. In further embodiments, a mixture of RFID tags or Bluetooth tags can be used. A skilled person may also understand that the Bluetooth standard (e.g., Bluetooth 4.0 or higher) used by the tags can be compatible with a RFID receiver of the mobile device. A corresponding rule should be applied in case of RFID tags.

The method for generating an alert on a mobile device in an absence of a RFID tag as described herein offers multiple advantages and technical effects. For example, a user of a mobile phone can be reminded not to forget items he or she may need for a specific type of event or a specific named event itself. However, in contrast to known technologies, the method of embodiments of the present invention described herein and the system of embodiments of the present invention described herein can include a self-learning feature. Accordingly, a user need not manually develop and edit identifier lists with RFID tag identifier codes. Furthermore, the method and the related system can determine through the self-learning feature that an event type never happened before by determining that a related profile list is empty, (i.e., no tag identifier is stored in the profile list). In such a case, the method includes adding all RFID tag identifiers into the event-related profile list during the course of a first event of a type (i.e., during the event time after the event start time). A user may optionally confirm each RFID tag identifier and thus each item to which a RFID tag relates. However, the system can also establish a profile list for the event by itself. The list can be editable, but in the initiation phase, the system teaches itself the required items/RFID tag identifiers.

If during a new event of the same type—i.e., using a same or a similar profile list—the system can determine that an item (i.e., RFID tag) is missing and can question a user whether the missing item is required. If the missing item is not required, the system removes the item from the profile list automatically. The same can happen to newly appearing items/RFID tags at a time of an event. If the item (i.e., RFID tag) is required (confirmed by the user), the system updates the related profile list automatically. Thus, the system can update itself to changing requirements of the user.

A further advantage of the method and system of embodiments of the present invention is the ability to share profile lists with other mobile devices and/or users. Thus, if one user may have forgotten to take a required item to a joint event of two or more users or mobile devices, the system can remind a second user to take the item with the RFID tag to the joint event if the first user does not carry the required item with him or her (i.e., if the RFID tag is not in proximity to the RFID reader of the mobile device). Hence, the advantages of social media networks are extended by embodiments of the present invention. Furthermore, embodiments of the present invention are extendable to a plurality of users. Users and/or mobile devices may share profile lists. A standard profile list for event types can be managed "in the cloud" in the sense of cloud computing. Users may use a standard profile list for an event type and the profile list to their special needs.

An additional benefit of embodiments of the present invention is the ability to mix RFID tags and Bluetooth tags. In this embodiment, the only additional requirement would to be to also have a Bluetooth receiver attached to a mobile device. This way, mixed technical environments can be supported. Furthermore, any other tag identification technology can be used.

Some additional embodiments are described below. According to one advantageous embodiment, the method of embodiments of the present invention can also include adding an additionally received RFID tag identifier to a profile list if the additionally received RFID tag identifier was received within a duration of an event after the event start time, and if, at the same time, the additionally received RFID tag identifier was not already stored in the profile list relating to the event. This feature can include an auto-learning modus (potentially user supported) in which the system can adapt to actual situations, such as a new RFID tag identifier located at the time and location of an event. This means that it can be helpful for a user to also carry the related item to related events at other times. Therefore, a question can be directed to the user by the mobile device, asking whether to also add this RFID tag identifier to the event related profile list. Consequently, the system can remind the user also to take the related item for a comparable event in the future. Thus, according to a further embodiment, adding the additionally received RFID tag identifier to the profile list can be performed if a confirmation message is received from the user.

According to another embodiment of the method, generating an alert can also include deleting a RFID tag identifier not among the received RFID tag identifiers from the profile list after a confirmation is received from a user. This portion of the method represents a second half of the auto-learning characteristic of the method (i.e., a "forget function"). If the user does not have a required item relating to a RFID tag in proximity to the mobile device, the system can recognize that it may not be required for future comparable events. A user may give a confirmation to remove the RFID tag from the profile list relating to an event identifier. Moreover, the RFID tag, and thus the related item, may still stay in the profile list, but can be marked as not required or optional. This way, a user can be reminded that an additional item was required in the past when he or she administers and edits the profile list.

According to another embodiment of the method, the event location and/or a home location can be defined by at least one of the following: a GPS position, a home location RFID tag, a WiFi transmitter having a defined location, a Bluetooth transmitter having the defined location, or an optical orientation transmitter having the defined location. To use the GPS position, a GPS receiver would need to be a part of the mobile device. Additionally, or alternatively, a RFID tag may mark a home location (e.g., a house, an apartment, a car, an office, a garage, or any other location that can be marked with a stationary RFID location tag). The location can also be identified by a known location of a WiFi transmitter, a Bluetooth transmitter, or an infrared (IR) signal emitted at the home location. Any home location can be defined for an event. Thus, if the home location is left by the user (as indicated by movement of a mobile device of the user) the alarm feature of the method of embodiments of the present invention can be activated.

According to a further embodiment, generating the alert can also include determining, by the mobile device of the user, that a home location was left. A standard home location or home base can be defined and altered if required. The alarm feature can be triggered on the mobile device if the mobile device has left the starting point (i.e., the home location) to go to the event location and/or if an event location was reached by the mobile device and/or if an intermediate position was reached prior to generating the alert. The intermediate position can be, for example, a walkway in front of the house, a corridor after leaving an apartment or an office, etc. The intermediate position can again be identified by a RFID or Bluetooth tag or a GPS location.

According to another embodiment, the method can also include defining the event for a first and a second mobile device, such as for a group event like a meeting. The profile list can then (at least in definable parts) apply to two or more mobile devices (i.e., two or more users). The generating the alert on the first mobile device can also include sending a message to the second mobile device. The message can include information about a requirement for a specific item (e.g., defined by the profile list) for the event. This can be done using a social media channel, an instant message channel, an SMS (short message service), or any other type of message transmitting technique. Thus, the method and related system of embodiments of the present invention can coordinate activities of more than one user. If one user may have forgotten to bring a required item, like a PC or a projector, to a meeting, the second meeting participant can be reminded (e.g., by a received alert) to bring the required item after the first meeting participant may have forgotten it.

Another characteristic can be implemented in a further advantageous embodiment of the method, according to which the triggering the alert conditions can be suppressed (i.e., suppressed at a first mobile device) if it is determined that a RFID tag identifier stored in the profile list (i.e., the required RFID tag and related item) is not among the received RFID tag identifiers for the event of the first mobile device after the event start time, but is in a proximity to the second mobile device. Therefore, a social network can be used as an automatic reminder system or social collaboration system reminding users of mobile devices equipped for carrying out the method of embodiments of the present invention to collectively correlate prerequisite items for an event, such as a meeting or another group activity. This function can easily be expanded from two constituents to a plurality of mobile devices/users.

According to an additional embodiment of the method, the event is triggered by a calendar entry. Hence, all data for the event can be stored in a calendar system of a user, including date and time, event identifier, event name, event duration, event location, event intermediate location, and an identifier or storage location identifier of the related profile list. In one optional embodiment, the profile list can be managed by the calendar system and/or the social media network system. Thus, the RFID tag identifiers can always be linked to the event triggering system.

As depicted and described below, a detailed description of the figures will be given. All instructions in the figures are schematic. Firstly, a block diagram of a method of embodiments of the present invention for generating an alert on a mobile device in an absence of a RFID tag is given. Secondly, further embodiments, as well as embodiments of a system for generating an alert on a mobile device in an absence of a RFID tag, will be described.

FIG. 1 shows a block diagram of an embodiment of a computer-implemented method 100 for generating an alert on a mobile device (e.g., a smart phone) in an absence of a RFID tag in proximity to the mobile device. The mobile device includes a RFID receiver or transmitter and/or a Bluetooth transmitter. The identification tag can be attached to any physical object large enough to have the identifier tag stuck to it.

The method at 102 can include defining an event using event data including an event identifier, and in particular also a name (e.g., "going fishing", or "having a meeting"). The event data can also include an event time (e.g., a date and/or a specific time), which basically can be a starting time of the event. Also an event duration (e.g., 2 hours) can be part of the event data, as well as an event location. This can be determined using different technologies know known or later discovered, such as by GPS (global positing system) positioning, a location RFID tag installed/fixed in a room/at a home location, a WiFi orientation post or bark, a Bluetooth orientation post or bark, an optical orientation post, etc. There can also be a profile list for storing RFID tag identifiers and the event identifier. It should be understood that the initial profile list may be empty or may have stored a special mark defining the profile list as non-initialized.

The method at 104 can include sharing the event data together with the profile list using a social media network. The profile list, as well as the event data, can be stored once in a cloud computing storage. Thus, all invited participants (or their profiled users) can have access to the profile list as well as the events.

The method at 106 can also include storing all received RFID tag identifiers (e.g., those in proximity to the mobile device) at a time within the duration of the event after a start time of the event in the profile list if the profile list was empty before the event start time (i.e., if the profile list had not been initiated beforehand). A user interaction can confirm the RFID tags once the list of related items has been displayed to the user. The user may also deselect specific items not required for the event but in proximity to the RFID receiver anyway.

Furthermore, the method at 108 can include generating the alert under alert conditions. The alert conditions can include a determination that the profile list was not empty before the event start time (i.e., it was initiated beforehand), and that one or more RFID tag identifiers stored in the profile list is not among the received RFID tag identifiers during the event duration after the event time.

FIG. 2 shows an overview 200 of basic functions of method 100 as a summary. One of the three main functions of method 100 is auto-learning and profile generation by auto-learning and profile generation module/component 202. Auto-learning and profile generation module 202 initiates a profile list and provides an auto-start to method 100 and a related system for carrying out method 100 without the requirement of manually maintaining a profile list for events. Another function of method 100 is carried out by RFID discovery module/component 204 which can be part of a mobile device 208. RFID discovery module 204 helps auto-learning and profile generation module 202 to initiate a profile list and manage the profile list, in particular, if a new item is found in the context of an event. Another function of method 100 is carried out by event-triggering event management module/component 206. Here, alarm generation, as well as updating the profile list referring to items not required for an event, is managed.

FIG. 3 show a block diagram of method 100 in the context of additional components. RFID discovery module 204, which relates to RFID tag 204A identifiers attached to physical items, as well as auto-learning and profile generation module 202 are known from FIG. 2. Auto-learning and profile generation module 202 can also be connected to a plurality of additional input channels 202a such as, for example, weather data, calendar system(s), GPS databases, and/or a GPS receiver in order to use this information as additional input for events and event triggering. Some of the additionally available data can, for example, be stored in the context of a profile list, for example, as part of the profile list. The alarm for a missing item can then be made dependent on environmental data. For example, in the case of a golf event, triggering an alarm for a missing umbrella will only be done if bad weather is expected. The RFID discovery engine/module/component 204 can cooperate with a compliance engine 302 for determining if all needed objects will be available for an event, and if not, an alarm is raised.

The item required can also be made dependent on outside environmental conditions. If, for example, the weather data shows expected rain, method 100 can activate the alarm if the user does not have an umbrella in proximity to the mobile device if leaving the house. Other conditions or conditional rules can be supported by an editable rule system.

On the other side, auto-learning and profile generation module 202 cooperates with a profile manager 304 which is closely related to profile list database 308 as well as the RFID database (not shown).

FIG. 4 shows a more detailed implementation 400 for a learning phase of the method of embodiments of the present invention and corresponding system. Implementation 400 starts at start ellipse 402 where a mobile device checks for a calendar date entry 406 at the current time. According to implementation 400, the mobile device can also open an access to RFID database 408 and profile database 410, which corresponds to the profile list database 308 from FIG. 3. Optionally, a GPS position of the mobile device can be requested at 404 from a GPS receiver. Next, the mobile device scans or checks at 412 for all RFID tags surrounding the mobile device. According to the method, information can be requested about an item a received RFID tag may be related to from the RFID DB 408.

Then the mobile device can check at 414 whether a profile list is related to a specific calendar entry at the current time. If not, all received RFID tag identifier values can be displayed at 422 on a screen of the mobile device together with a clear name meaning, which can be requested from RFID database 408 which can store a relationship between a RDIF tag and an item the RFID tag is attached to. This can be a comprehensive list of RFID tag identifiers and/or items. Next, at 424, a user of the mobile device can be asked whether the user wants to create a new profile or profile list. In such a case, profile database 410 can be updated with a new profile list relating to an event type.

In case a profile or profile list has been selected at 414, the user of the mobile device can be asked via an interactive screen (e.g., a touch sensible screen) whether to update the profile list. This could be in response to more or less RFID tags having been received in comparison to the RFID tags required by the profile list which can at that time be activated based on the event related to a calendar entry.

In the case that the user confirms that an update is required at 416, the profile list can be updated at 418 with new selected RFID tag identifiers. As an example: a calendar entry shows an event "going for golf". The mobile device scans the surrounding area and can detect that a plurality of items are required for going to play golf, such as a golf bag, a golf bag trolley, a pair of golf shoes, etc. However, when scanning the nearby environment for RFID tags, the system/mobile device can detect a RFID tag identifier that is not on the profile list for "going golfing." However, the newly identified RFID tag identifier can identify a new item, such as a bag for golf tees. In such a case, the user of the mobile device can confirm that this newly found item (and the new RFID tag identifier attached to the item) should be added to the list, such that the list can be updated at 418.

In another implementation, RFID database 408, as well as profile list database 410, can be made available to other users or to another system for generating an alert on a mobile device in an absence of a RFID tag in proximity to the mobile device. This way, event and profile list contents can be shared and coordinated among event participants. RFID database 408, as well as the profile list database 410, can be shared using the Internet by a cloud service or via a social network 420.

FIG. 5 shows another flowchart illustrating a process flow 500 after a system (e.g., a mobile device) for carrying out embodiments of the present invention has identified an event. The method executed by the system starts at 502. The system waits for an event at 504. If the event happens (e.g., triggered by a calendar entry) a profile list can be applied at 506. Then, the detected RFID tag identifiers in a surrounding area or proximity to the mobile device can be detected. The system can determine whether all RFID tag identifiers relating to items required for the event are present (i.e., receivable). If that is the case, an alarm (e.g., an acoustic alarm, a vibrating alarm of an optical alarm) can be triggered at 512. The user can be asked whether an item relating to the RFID tag identifier is required for the event at 514.

If the response to this request is "yes", the system can check at 516, via the Internet, a cloud computing service, or a social network interface 518, the profile list of another person (e.g., a friend) also invited to the event and whether he or she will bring the missed item to the joint meeting. If that is not the case, at 520 the system gives the user some additional time at 522 to fetch the additional item. The RFID tag identifiers can be checked again at 508. If now all items required for the event are present (as determined at 510), the method continues at 518, with the auto-learning module described in the context of FIG. 4.

If at the interaction step with the user the system asks whether the item is required for the event (i.e., at 514), and the user responds with a "no," the user may confirm at 524 a removal of the RFID tag of the related profile list, and the RFID tag relating to the item is removed at 522. Further, the profile is updated at 526, accordingly, and the update is written at 528 to profile database 410. The system implementing the method returns then to the step of waiting for an event at 504.

FIG. 6 shows a block diagram of an embodiment of system 600 for carrying out embodiments of the present invention for generating an alert on a mobile device 602 of system 600 in an absence of a RFID tag 204A. Mobile device 602 includes a RFID receiver 606. System 600, and in particular mobile device 602, also includes a definition unit 608 adapted for defining an event using event data comprising an event identifier, an event time, an event duration, and an event location. A profile list for storing RFID tag identifiers is related to said event identifier.

Mobile device 602 also includes a sharing unit 610 adapted for sharing said event data together with said profile list using a social media network, and a storage unit 612 adapted for storing all received RFID tag identifiers at a time within said duration of said event after an event start time in said profile list if said profile list was empty before said event start time.

Lastly, the mobile device includes an alarm generation unit 614 adapted for generating said alert under alert conditions. The alert conditions include a determination that said profile list was not empty before said event start time, and that one RFID tag identifier stored in said profile list is not among said received RFID tag identifiers during said event duration after said event time.

Embodiments of the present invention can be implemented together with virtually any type of computer, regardless of the platform being suitable for storing and/or executing program code. FIG. 7 shows, as an example, a schematic of a computing system 700 suitable for executing program code relating to the methods of embodiments of the present invention. A related system can be implemented as a part of a mobile device (e.g., a smart phone), potentially as a smart phone app.

The computing system 700 is only one example of a suitable computer system and is not intended to suggest any limitation as to the scope of use or functionality of embodiments of the present invention described herein. Regardless, computer system 700 is capable of being implemented and/or performing any of the functionality set forth hereinabove.

In the computer system 700, there are components that are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 700 may be described in the general context of computer system-executable instructions, such as program modules, being executed by a computer system 700. Generally, program modules may include routines, programs, objects, components, logic, data structures, and so on, that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 7, computer system/server 700 is shown in the form of a general-purpose computing device. The components of computer system/server 700 may include, but are not limited to, one or more processors or processing units 702, a system memory 704, and a bus 706 that couples various system components including system memory 704 to processor 602.

Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 702 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 702 collects and routes signals representing inputs and outputs between external devices 718 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 702 executes computer program code, such as program code for generating an alert on a mobile device in an absence of a RFID tag in a proximity to the mobile device, which is stored in memory 704, storage system 712, and/or program/utility 716. While executing computer program code, processing unit 702 can read and/or write data to/from memory 704, storage system 712, and program/utility 716.

Computer system/server 700 typically includes a variety of computer system readable media. Such media may be any available media that is accessible by computer system/server 700, and it includes both volatile and non-volatile media, and removable and non-removable media.

The system memory 704 can include computer system readable media in the form of volatile memory, such as random access memory (RAM) 708 and/or cache memory 710. Computer system/server 700 may further include other removable/non-removable, volatile/non-volatile computer system storage media (e.g., VCRs, DVRs, RAID arrays, USB hard drives, optical disk recorders, flash storage devices, and/or any other data processing and storage elements for storing and/or processing data). By way of example only, storage system 712 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 706 by one or more data media interfaces. As will be further depicted and described below, memory 704 may include at least one program product having a set (e.g., at least one) of program modules that are configured to carry out the functions of embodiments of the present invention.

Program/utility 714, having a set (at least one) of program modules 716, may be stored in memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the present invention as described herein.

The computer system/server 700 may also communicate with one or more external devices 718 such as a keyboard, a pointing device, a display 720, etc., one or more devices that enable a user to interact with computer system/server 700, and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 can communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, data archival storage systems, etc.

Additionally, a RFID receiver 606 and/or a Bluetooth receiver (or a respective transmitter) may be attached to the bus system 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable hardware storage device can be a tangible device that can retain and store instructions for use by an instruction execution device. The computer readable hardware storage device may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable hardware storage device includes the following: a semi-conductor or solid state memory, a portable computer diskette, a hard disk, a random access memory (RAM), a read-only memory (ROM), an erasable programmable read-only memory (EPROM or Flash memory), a static random access memory (SRAM), a rigid magnetic disk, an optical disk, a portable compact disc read-only memory (CD-ROM), a compact disk-read/write memory (CD-RW), a digital versatile disk (DVD), a Blu-Ray disk, a memory stick, a floppy disk, magnetic tape, a mechanically encoded device such as punch-cards or raised structures in a groove having instructions recorded thereon, and any suitable combination of the foregoing. A computer readable hardware storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable hardware storage device or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable hardware storage device within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable hardware storage device that can direct a computer, a programmable data processing apparatus, and/or other devices to function in a particular manner, such that the computer readable hardware storage device having instructions stored therein includes an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit embodiments of the present invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, the terminology and embodiments used herein were chosen in order to best explain the principles of the present invention, the practical applications and technical improvements over technologies found in the art, and to enable others of ordinary skills in the art to understand the present invention through various embodiments with various modifications, as are suited to the particular uses contemplated.

The descriptions of the various embodiments of the present invention have been presented for purposes of illustration, but are not intended to be exhaustive or limited to the embodiments disclosed. The corresponding structures, materials, acts, and equivalents of all elements in the claims below are intended to include any structure, material, or act for performing functions of embodiments of the present invention in combination with other claimed elements, as specifically claimed. The above description of embodiments of the present invention has been presented for the purpose of illustration and description, but is not intended to be exhaustive or limited to the present invention in the form disclosed. Many modifications and variations will be apparent to those of ordinary skills in the art without departing from the scope and spirit of the present invention.

What is claimed is:

1. A computer-implemented method for generating an alert in an absence of a radio-frequency identification (RFID) tag in a proximity to a first mobile device, the first mobile device comprising a RFID receiver, the method comprising:
   detecting RFID tags in proximity to the first mobile device;
   generating the alert in response to alert conditions, wherein the alert conditions comprise a determination that a RFID tag identifier stored in a first profile list is not among RFID tag identifiers corresponding to the detected RFID tags and that an RFID tag corresponding to the RFID tag identifier stored in the first profile list is not in proximity to a second device; and
   transmitting the alert to the second mobile device, the second mobile device not being in the proximity to the first mobile device, wherein the alert adds, responsive to the RFID tag identifier stored in the first profile list not being among the RFID tag identifiers corresponding to the detected RFID tags at the first device, the RFID tag identifier stored in the first profile list that was not among the RFID tag identifiers corresponding to the detected RFID tags to a second profile list associated with the second mobile device for storing RFID tag identifiers, wherein the second profile list is separate from the first profile list.

2. The method according to claim 1, the method further comprising adding an additional RFID tag identifier to the first profile list in the case that the additional RFID tag identifier is detected and was not stored in the first profile list.

3. The method according to claim 2, the method further comprising adding the additional RFID tag identifier to the first profile list in response to receiving a confirmation message from a user.

4. The method according to claim 1, wherein the generating the alert further comprises deleting from the first profile list the RFID tag identifier that is not among the detected RFID tag identifiers in response to receiving a confirmation from a user.

5. The method according to claim 1, wherein the generating the alert is in response to at least one item selected from the group consisting of: a determination by the mobile device that a home location has been left, a determination by the mobile device that an event location has been reached, and a determination by the mobile device that an intermediate position has been reached.

6. The method according to claim 1, wherein the alert conditions are suppressed in the case that the RFID tag identifier stored in the first profile list that is not among the RFID tag identifiers is in a proximity to another mobile device.

7. The method according to claim 1, wherein generating the alert is triggered by a calendar entry.

8. A system for generating an alert in an absence of a radio-frequency identification (RFID) tag in a proximity to a first mobile device, the first mobile device comprising a RFID receiver, the system comprising:
   a memory medium comprising program instructions;
   a bus coupled to the memory medium; and
   a processor, for executing the program instructions, that when executing the program instructions causes the system to:
   detect RFID tags in proximity to the first mobile device;
   generate the alert in response to alert conditions, wherein the alert conditions comprise a determination that a RFID tag identifier stored in a first profile list is not among RFID tag identifiers corresponding to the detected RFID tags and that an RFID tag corresponding to the RFID tag identifier stored in the first profile list is not in proximity to a second device; and transmit the alert to the second mobile device, the second mobile device not being in the proximity to the first mobile device, wherein the alert adds, responsive to the RFID tag identifier stored in the first profile list not being among the RFID tag identifiers corresponding to the detected RFID tags at the first device, the RFID tag identifier stored in the first profile list that was not among the RFID tag identifiers corresponding to the detected RFID tags to a second profile list associated with the second mobile device for storing RFID tag identifiers, wherein the second profile list is separate from the first profile list.

9. The system according to claim 8, the instructions further causing the system to add an additional RFID tag identifier to the first profile list in the case that the additional RFID tag identifier is detected and was not stored in the first profile list.

10. The system according to claim 9, the instructions further causing the system to add the additional RFID tag identifier to the first profile list in response to receiving a confirmation message from a user.

11. The system according to claim 8, the instructions further causing the system to delete from the first profile list the RFID tag identifier that is not among the detected RFID tag identifiers in response to receiving a confirmation from a user.

12. The system according to claim 8, wherein the generating the alert is in response to at least one item selected from the group consisting of: a determination by the mobile device that a home location has been left, a determination by the mobile device that an event location has been reached, and a determination by the mobile device that an intermediate position has been reached.

13. The system according to claim 8, the instructions further causing the system to suppress the alert conditions in the case that the RFID tag identifier stored in the first profile list that is not among the RFID tag identifiers is in a proximity to another mobile device.

14. The system according to claim 8, wherein generating the alert is triggered by a calendar entry.

15. A computer program product for generating an alert in an absence of a radio-frequency identification (RFID) tag in a proximity to a first mobile device, the first mobile device comprising a RFID receiver, the computer program product comprising a computer readable hardware storage device having program instructions embodied therewith, the program instructions being executable by one or more computing systems to cause the one or more computing systems to:

detect RFID tags in proximity to the first mobile device;

generate the alert in response to alert conditions, wherein the alert conditions comprise a determination that a RFID tag identifier stored in a first profile list is not among RFID tag identifiers corresponding to the detected RFID tags and that an RFID tag corresponding to the RFID tag identifier stored in the first profile list is not in proximity to a second device; and transmit the alert to the second mobile device, the second mobile device not being in the proximity to the first mobile device, wherein the alert adds, responsive to the RFID tag identifier stored in the first profile list not being among the RFID tag identifiers corresponding to the detected RFID tags at the first device, the RFID tag identifier stored in the first profile list that was not among the RFID tag identifiers corresponding to the detected RFID tags to a second profile list associated with the second mobile device for storing RFID tag identifiers, wherein the second profile list is separate from the first profile list.

16. The computer program product according to claim 15, the computer readable hardware storage device further comprising instructions to add an additional RFID tag identifier to the first profile list in the case that the additional RFID tag identifier is detected and was not stored in the first profile list.

17. The computer program product according to claim 16, the computer readable hardware storage device further comprising instructions to add the additional RFID tag identifier to the first profile list in response to receiving a confirmation message from a user.

18. The computer program product according to claim 15, the computer readable hardware storage device further comprising instructions to delete from the first profile list the RFID tag identifier that is not among the detected RFID tag identifiers in response to receiving a confirmation from a user.

19. The computer program product according to claim 15, wherein the generating the alert is in response to at least one item selected from the group consisting of: a determination by the mobile device that a home location has been left, a determination by the mobile device that an event location has been reached, and a determination by the mobile device that an intermediate position has been reached.

20. The computer program product according to claim 15, the computer readable hardware storage device further comprising instructions to suppress the alert conditions in the case that the RFID tag identifier stored in the first profile list that is not among the RFID tag identifiers is in a proximity to another mobile device.

* * * * *